United States Patent [19]
Pryor

[11] Patent Number: 5,380,095
[45] Date of Patent: Jan. 10, 1995

[54] BEARING ARRANGEMENT HAVING MAGNETIC ATTRACTION BETWEEN SLIDERS AND CLEARANCE MECHANISM

[76] Inventor: Paul L. Pryor, 10 Lonsdale Ave., Dayton, Ohio 45419

[21] Appl. No.: 977,273

[22] Filed: Nov. 16, 1992

[51] Int. Cl.⁶ .............................................. F16C 17/00
[52] U.S. Cl. ....................................................... 384/8
[58] Field of Search .................................. 384/8, 9, 49; 248/206.5; 335/306, 219, 285, 295; 104/281, 283, 286; 310/90.5, 8

[56] References Cited

U.S. PATENT DOCUMENTS

| | | | |
|---|---|---|---|
| 3,720,849 | 3/1973 | Bardocz | 310/8 |
| 3,789,285 | 1/1974 | Nishizawa | 318/687 |
| 3,895,846 | 7/1975 | Edwards | 310/90.5 |
| 4,065,188 | 12/1977 | Ridler et al. | 308/10 |
| 4,505,464 | 3/1985 | Chitayat | 384/50 X |
| 4,570,249 | 2/1986 | Malissin et al. | 369/45 |
| 4,704,712 | 11/1987 | Siryj | 369/249 |
| 5,237,238 | 8/1993 | Berghaus et al. | 310/328 |

FOREIGN PATENT DOCUMENTS 0106220  6/1983  Japan ................................ 310/90.5

*Primary Examiner*—Daniel P. Stodola
*Attorney, Agent, or Firm*—Biebel & French

[57] ABSTRACT

A slide mechanism for accurate linear, nonlinear and rotational motion. A first slide located in slidable relation to a second slide wherein the slides are separated by a distance except for small bearing surface. A portion of each of the slides is made of a magnetic material such that the slides are attracted to each other thereby maintaining the first and second slides in slidable relation. Apparatus for adjusting the separation distance between the magnetic materials of said surfaces such as a bearing set screw is disposed in one of the slides thereby providing the adjustment of the distance between the magnetic surfaces of the first and second slides. The bearing of the bearing set screw rest upon the opposite slide and provides a smooth movement of the sliding of the slide mechanism. The slide mechanism provides smooth and accurate movement for several mechanical devices.

20 Claims, 8 Drawing Sheets

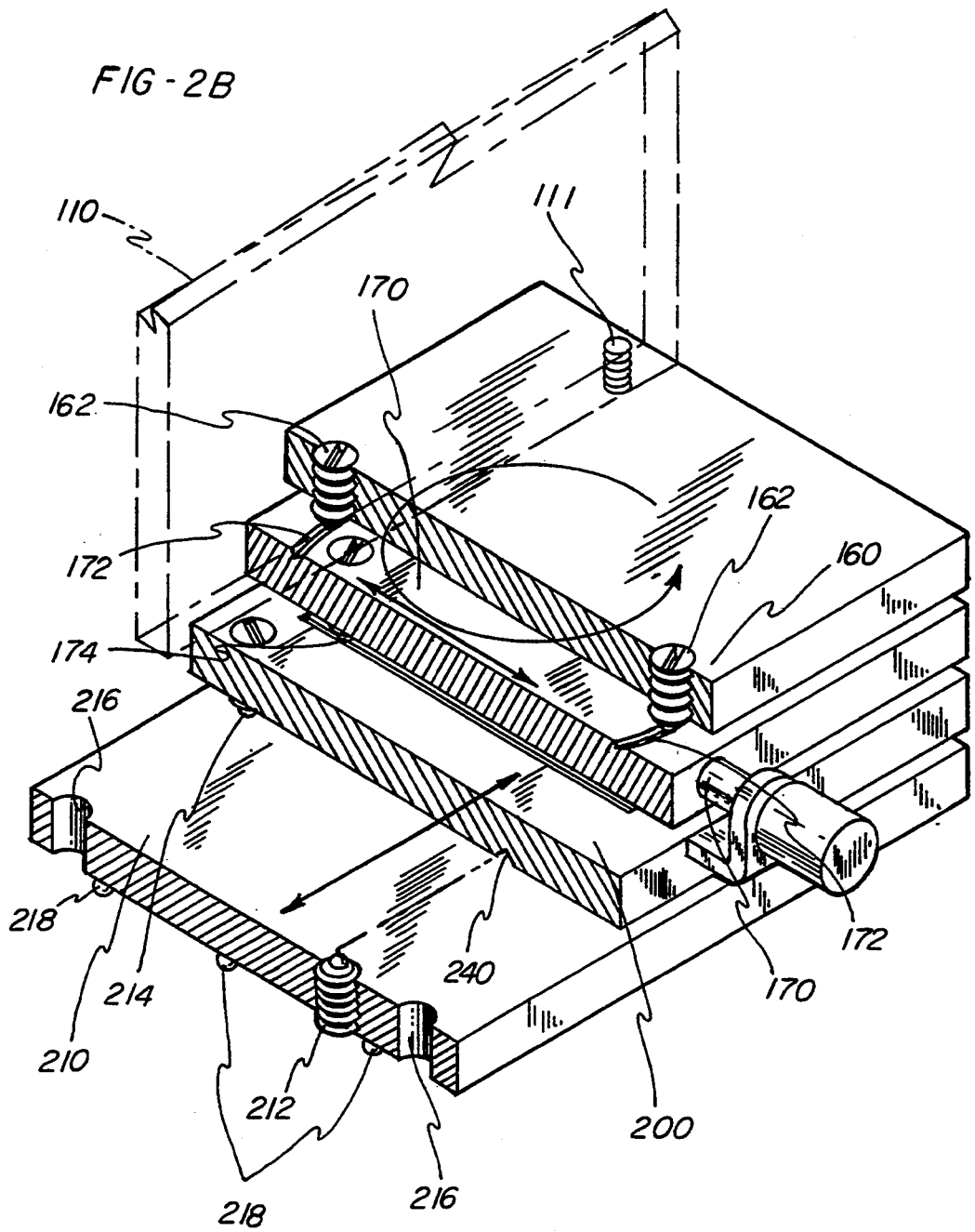

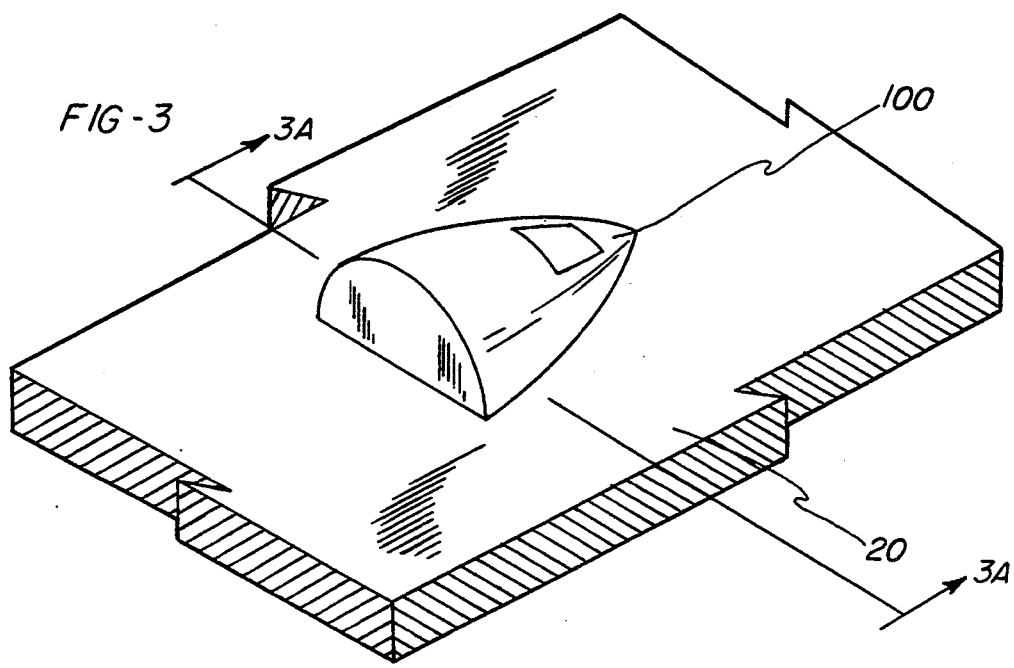
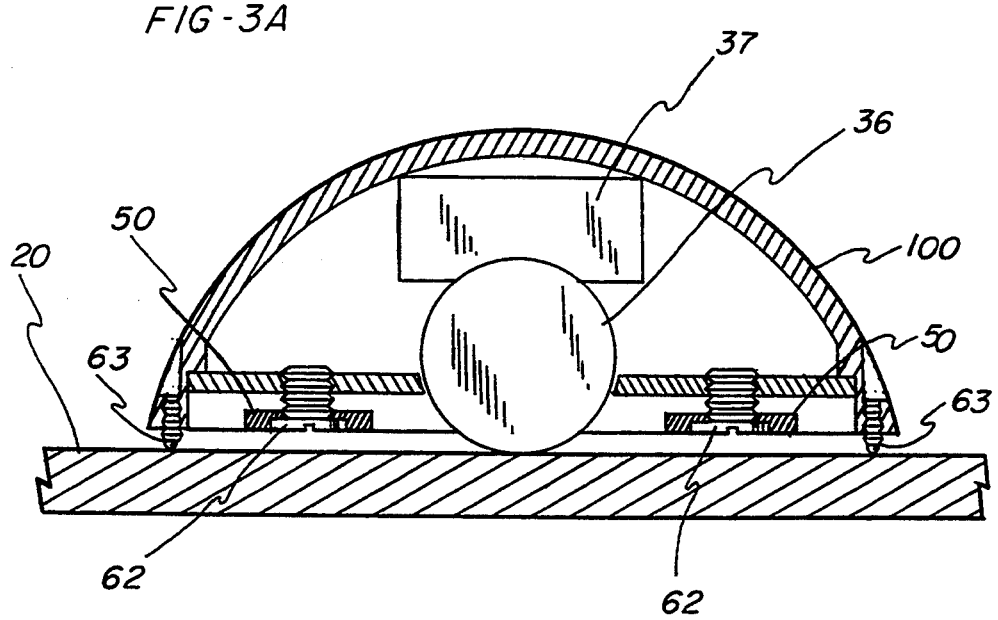

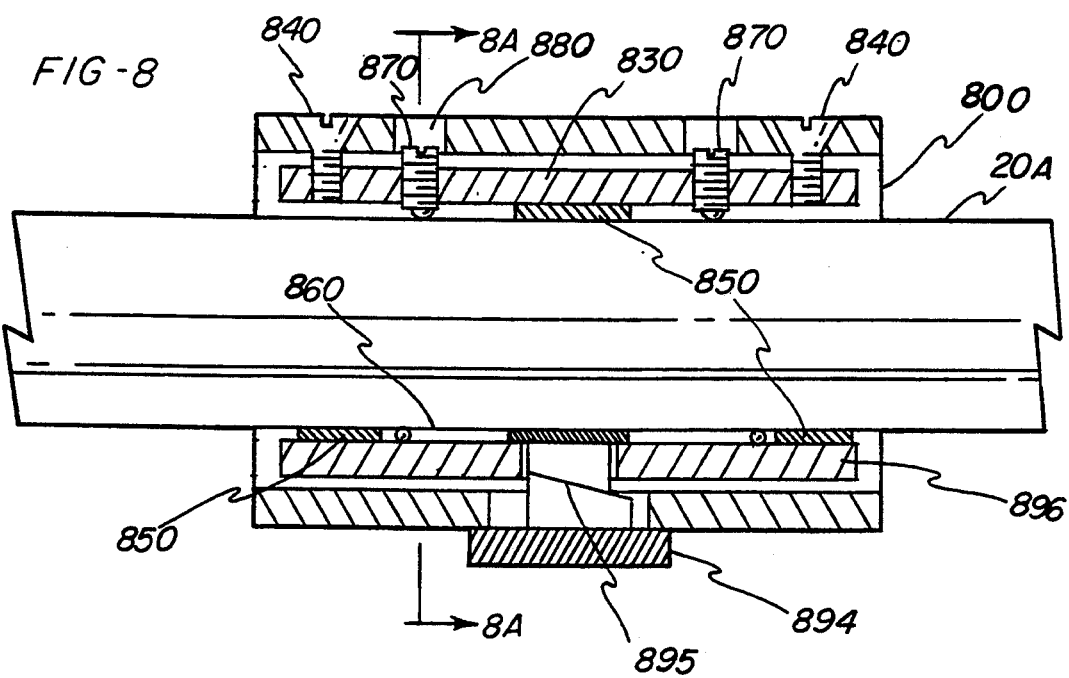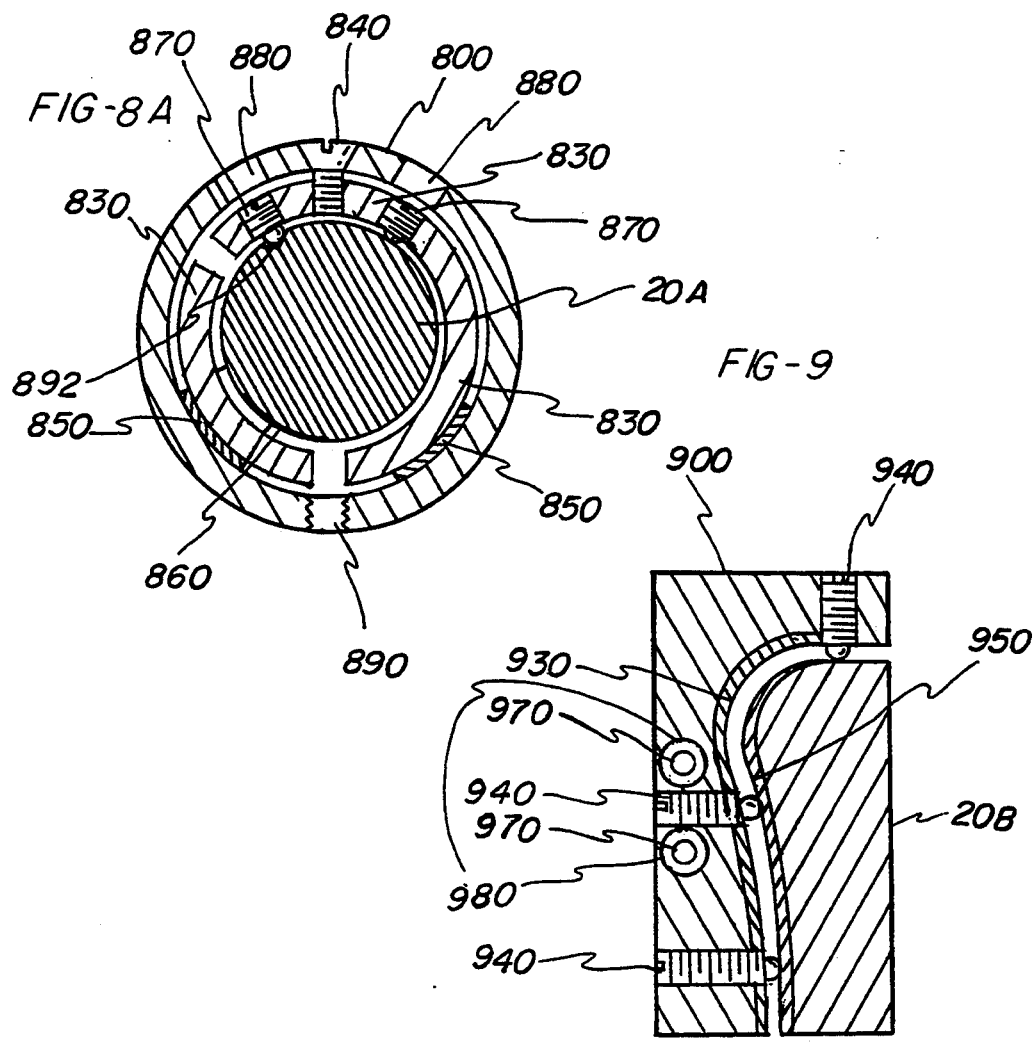

BEARING ARRANGEMENT HAVING MAGNETIC ATTRACTION BETWEEN SLIDERS AND CLEARANCE MECHANISM

BACKGROUND OF THE INVENTION

1. Field of the Invention

This invention generally relates to devices and methods of controlling the function and smoothness of action involved in many mechanical movements. This invention is related to sliding surfaces both linear and rotational and involves the use of controlled magnetic forces.

2. Description of the Prior Art

Many methods and devices have been utilized in the production of accurate, smooth acting, low resistance sliding mechanisms, such as dovetail slides with adjustable jib, ball bearing slides, rotating bearings in retainer and continuous array for linear movement and rotational movement. Although lubrication of bearing surfaces is important in producing smooth low friction movements, precision machining is paramount in producing accuracy as well as smoothness of operation. Precision air bearings and bearings in vacuum are often considered as the ultimate in reducing friction.

Other factors besides reduced friction are of consideration in producing a desirable sliding or rotating action. Too free a movement, particularly when the moving element requires adjusting or setting to a desired position often results in "overshooting" or hunting, to reach the desired position. Too free a movement can contribute to "back lash" and instability in holding on a desired position. Therefore a certain amount of resistance to movement is often desirable and many devices are presently provided with means of controlling resistance—such as the well known "jib" on a conventional undercut and lubricated dovetail slide.

This present invention describes how magnetic forces can be used in controlling the action, feel, sticking and friction of sliding surfaces in a simple adjustable manner which does not necessarily require highly precise machining of the related parts. Magnetic forces are being used in some situations today, in some devices, but not in a manner whereby the magnetic forces can be mechanically adjusted so as to achieve the desired smooth action.

A "magnetic-kinematic" principle is presently being used by Physik Instruments (PI) (U.S. Pat. No. 3,720,849 to Bardocz) in a design of their micropositioner to assist in achieving extremely high precision and accuracies of positioning in the sub-micron range where ±0.000005 inch are required. Part of their design incorporates what they call "magnetically-coupled" ball bearing slides in which the two sides of the slide are held together against ball bearings by internal magnets separated by a few tenths of a millimeter. This separation distance is not adjustable. Therefore the performance of the slide is determined at tile factory.

In my invention, sub-micron accuracies are not an objective. Controllability and adjustability as well as economy of production are some of the objectives as will be seen in this specification. The above PI system does not provide adjustability and is considerably more expensive to produce than are devices produced in accordance with this invention. Some of the devices and parts described in this invention can even be molded not machined. While ball bearings can be used, they are not necessary.

In addition to the field of micropositioners, smooth acting relatively accurate sliding devices and mechanisms are utilized in many areas, such as door slides, drawer slides, computer mouse input devices, microscope stages as well as larger stages, positioners used in manufacturing, optical equipment, cameras and accessories, etc.

The techniques and devices described in this patent have many applications. In most cases the parts and mechanisms required can be made of molded plastic. These devices and mechanisms can be made to replace or substitute for more expensive devices such as dove tail slides, rack and pinion, adjustments, continuous ball bearing slides, high load resistant bearings, etc.

Other patents which utilized magnetic forces to assist in the action of sliding mechanisms are as follows:
- U.S. Pat. No. 4,065,188—Linear Bearings for Parallel Tracking Arm
- U.S. Pat. No. 4,570,249—Optical Read/Write Head for Recording and Playback of an Optical Disk and an Optical Device Associated with said Optical Head
- U.S. Pat. No. 4,704,712—Low-Friction Apparatus for Optical Disk Translation Stage
- U.S. Pat. No. 3,789,285—Position Control System Using Magnetic Force In all of the above patents magnetic forces are used but not in the manner of my invention and in none of the above patents as well as the "PI" "Magnetic-Kinematic" principle (see previous paragraph) is the sliding action adjustable as it is in my invention.

In U.S. Pat. No. 4,065,188 magnetic forces are used to hold a lubricant in position between a bearing surface and a moveable bearing surface. This is accomplished by incorporating magnetic material in the lubricating material so that it is attracted by magnetic forces to one of the bearing surfaces. This device is not adjustable in the sense that my present invention is.

In U.S. Pat. No. 4,570,249 a system of magnets and conductors are arranged such that an electric current on an adjacent surface will produce a magnetic field repulsive to the magnetic field generated by the magnet on the other surface and thus move one surface with respect to the other. This is in no way an adjustable sliding bearing of the type described herein.

In U.S. Pat. No. 4,704,712 magnetic forces are used in a sliding bearing to provide a low friction device that incorporates air bearings, the magnetic forces are used to maintain a consistent position of the sliding surface as it moves along the magnets incorporated in a rail. The magnetic forces hold the sliding member close to the rail so that the air, escaping through small openings, which force the sliding member away, is counteracted thus providing an air bearing. An electric linear motor provides the motivating force to the sliding member. This is not a simple sliding system in which the "feel" of the sliding action is controllable as in my invention.

In U.S. Pat. No. 3,789,285 the electromagnets are not permanent magnets as in my invention, but are used to provide a motivating force to adjust the position of one member with respect to another by controlling the electric current that activates the magnets. In my invention the motivating force can be by human adjustment of a screw (micrometer), cam, lever or it can be electrical such as a magneto ceramic positioner, linear motor, or it can be pneumatic, hydraulic, etc. In my invention permanent magnets are utilized and the spacing is adjusted to provide a smooth acting "feel" to the movement of a sliding device. This invention also does not apply to magnetic bearings which are intended to almost completely eliminate friction and the need for lubrication.

SUMMARY OF THE INVENTION

In accordance with the principles of this invention a low-friction slide technique and devices are disclosed. All the devices described herein have in common at least one surface sliding in near contact with another surface in which part or all of one surface is a permanent magnet and all or part of the other surface is a ferromagnetic material. The proximity of the two surfaces is controlled and/or adjustable such that the magnetic forces acting between the surfaces control the action between the moving surfaces so as to hold the relative positions without uncontrolled slipping and thus eliminate backlash, overshooting and hunting, and yet provide a low friction movement.

The adjustment of the distance between the two sliding surfaces can be achieved in different ways as described herein.

The two surfaces that move with respect to one another need not be planar as long as the two surfaces are approximately conformal.

The two surfaces need not be smooth or accurately machined, thus expensive manufacturing techniques are eliminated.

The accuracy of movement, which may in some cases be somewhat limited, will be determined by the accuracy of the actual bearing surfaces and guideways in which or on which the bearings ride. These bearings can be of the ball or roller type or they can be simple relatively small, properly lubricated contact elements (non-rotating) riding on a surface or on or in a guiding way or track.

It is therefore the object of this invention to provide a system of parts whereby the motion between sliding surfaces is controlled in an adjustable manner providing a smooth even action of more or less resistance to the motivating force causing the movement.

Another object of this invention is to provide devices with sliding surfaces wherein the sliding motion is smooth and easy without sticking, backlash or hunting.

Another object of this invention is to provide simple low cost positioning elements that provide the performance of carefully machined parts with relatively low cost and simply produced parts.

Other objects, advantages and novel features of the present invention will become apparent from the following detailed description of the invention when considered in conjunction with the accompanying drawings.

BRIEF DESCRIPTION OF THE DRAWINGS

FIG. 2B is a perspective view, partially in section, of a modified form of the arrangement of FIG. 2A but providing 3 degrees of movement.

FIG. 3 illustrates a computer mouse which incorporates the principles of this invention.

FIG. 3A is a cross section of FIG. 3 at 3A—3A and illustrates another means of adjusting the distance between the sliding surfaces and thus the magnetic force.

" FIG. 5 also shows that sliding surfaces need not be planar of flat and that sliding surface and bearing surface need not be in the same parallel plane.

FIG. 8 illustrates a slider that operates on either a horizontal or vertical rod or pipe that incorporates the principles of this invention.

FIG. 8A is a cross section of FIG. 8 at 8A—8A.

FIG. 9 is a cross section of a slider that conforms to a complex surface such as a molding over an opening in a room.

DESCRIPTION OF THE PREFERRED EMBODIMENTS

Figure 1:
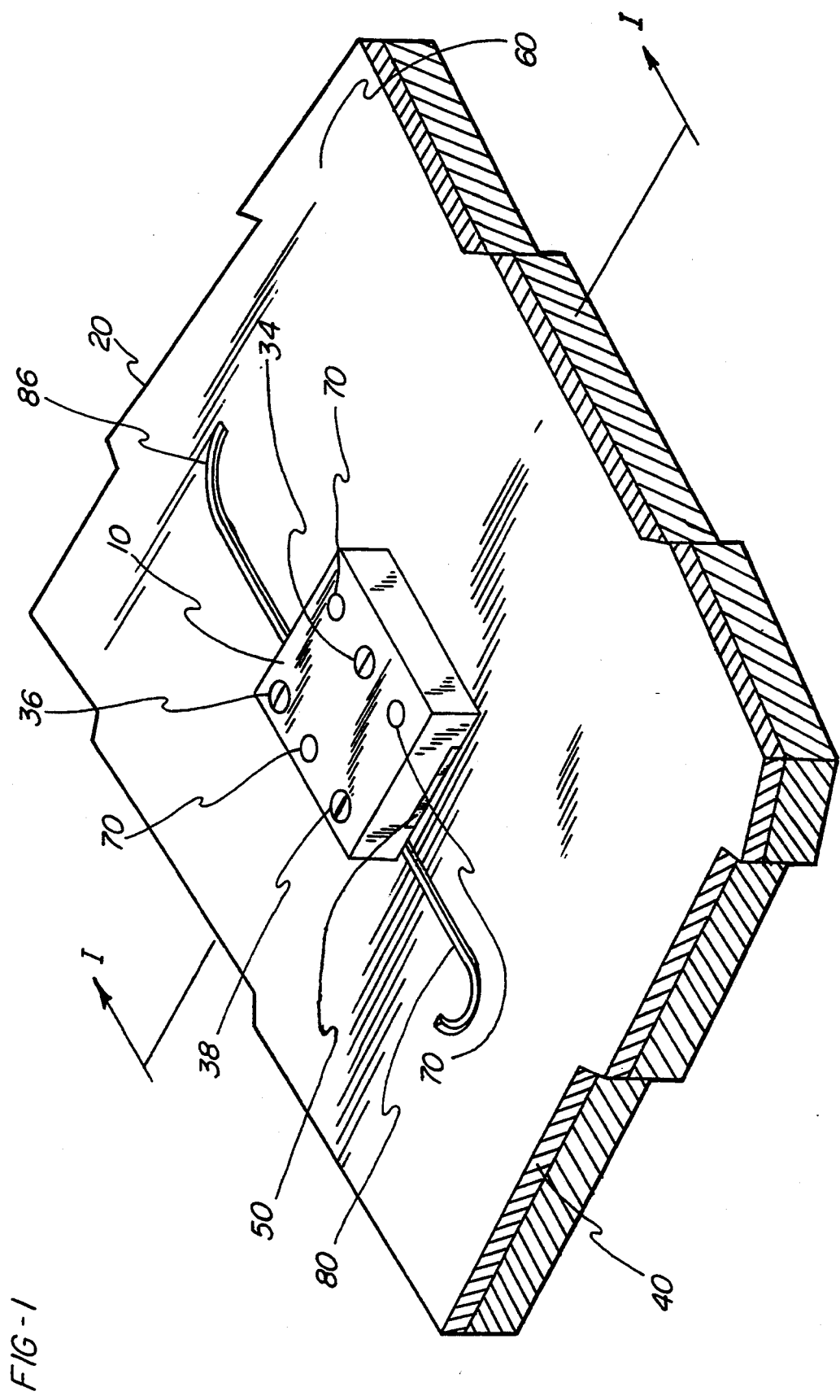
FIG. 1 illustrates the basic features of a generic slider incorporating the principles of this invention.

Referring to FIG. 1, there is shown a perspective drawing of a generic slider and a base on which the slider slides. The slider 10 moves with respect to base 20 on bearings 32 (FIG. 1A) mounted in slider 10. These bearings which in this case are ball bearings such as 32 FIG. 1A) are mounted in the end of set screws 34, 36 and 38. These set screws 34, 36 and 38 are adjustable in and out of slider 10. Thus when resting on base plate 20 this adjustment controls the distance between the bottom surface of slider 10 and top surface of plate 20. Other adjustable actions such as lever or side operation wedge could also be used.

Either slider 10 or base 20 is made all or in part with ferromagnetic material 40 and the other surface is made all or in part of a permanent magnet material 50. Thus when the separation of these two surfaces is varied by set screws 34, the magnetic force between them is varied and controlled by controlling this distance with set screws such as 34 FIG. 1A.

Figure 1A:
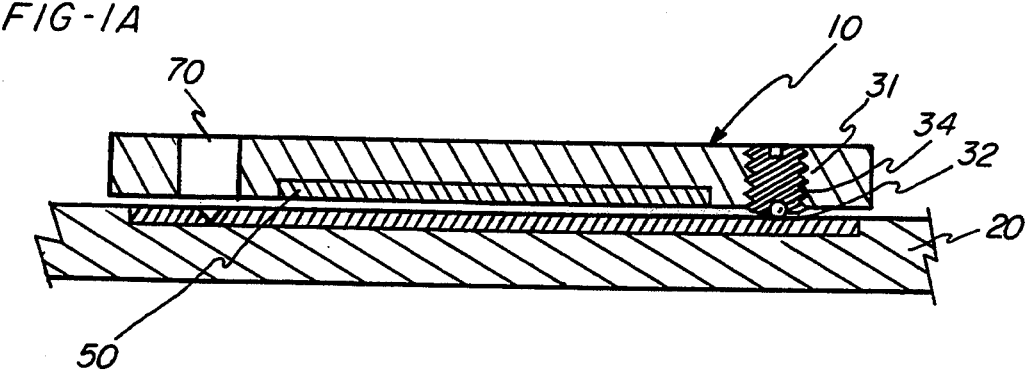
FIG. 1A is a cross section of the sliding element in FIG. 1, looking along lines 1—1 of FIG. 1.

Other means than set screws 34, 36 and 38 for controlling the distance between surfaces 40 and 50 FIG. 1A, in order to control the magnetic force, are possible. One such means would be to control the position of 40 and or 50 with respect to each other independent of the bearing surface 32 (FIG. 1A) by raising or lowering a portion of one of the surfaces by suitable means such as wedge, lever or screw. The bearing surface need not be of the roller or bail bearing type as shown in FIG. 1 and 1A, but can be a flat or curved surface of suitable material or even air if proper constraints are incorporated.

In FIG. 1 mounting holes 70 are provided for mounting other useful members to provide a variety of functions.

When bearings 36 and 38, in FIG. 1 or counterparts are allowed to rest in or on guide ways such as 80, the movement of slider 10 is constricted. The accuracy of construction of bearings 32 and the guide 80 determine the accuracy of any prescribed motion. Guide 80 will provide linear motion when bearings 36 and 38 rest in a straight portion of this groove with bearing 34 resting on a flat portion of surface 20. Complex cam-like motions and circular motion can be provided with appropriately shaped guide ways.

The motion of slider 10 in a direction toward or away from the surface 60 on which it moves can be controlled by the depth or height of the guide way groove 80 as at 86 FIG. 1. This variation in depth such as 86 on groove 80 FIG. 1 will cause the two surfaces 40 and 50 to come closer or further away as slider 10 moves and thus control the magnetic force as a function of the position of slider 10 on plate 20. This can be useful in controlling the "feel" of the movement as a function of position as well as provide a breaking action, locking action and a "joltless bumper".

Since the accuracy and precision of the movements described above will be determined to a large extent by the accuracy and precision of the bearings and guide ways, it may be advisable to construct such bearings and guide ways of material different from the slider and base and with different manufacturing techniques, and add them as inserts.

Figure 4:
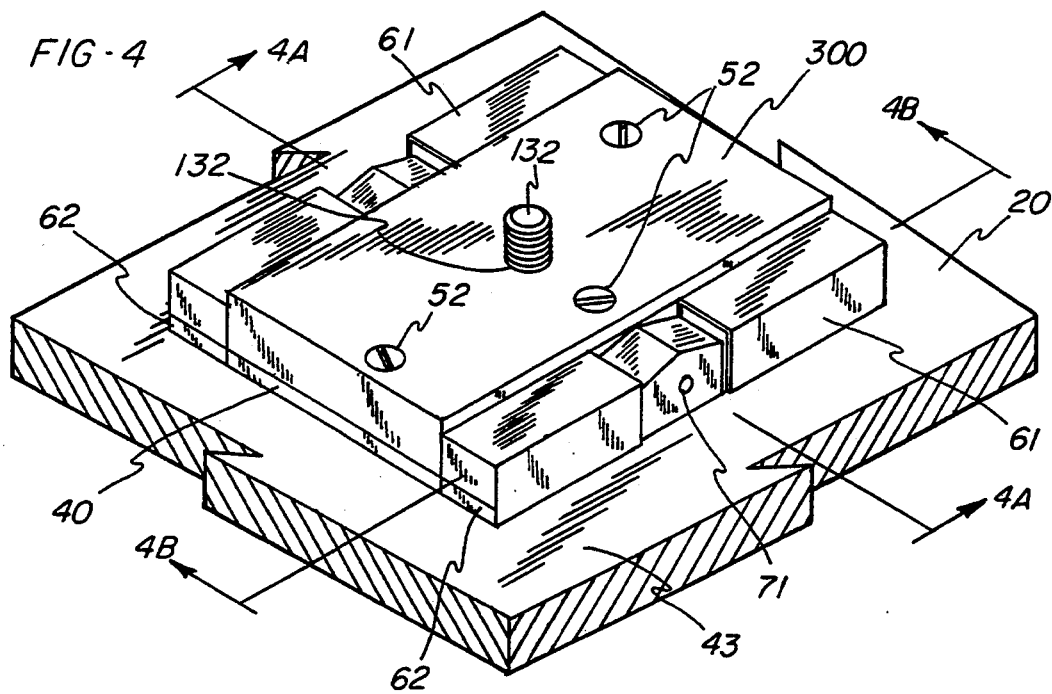
FIG. 4 illustrates a mounting system for a camera or other instrument which incorporates the principles of this invention and also utilizes a magnetic brake or lock operating against a ferromagnetic surface either or both of which can be textured.

In addition to the magnetic forces interacting between the slider and its base, other forces play an important part in the behavior of the slider's action such as friction and sticking. Choice of materials for guide ways and bearings and designs that reduce the contact areas will reduce friction and sticking to a minimum. If some friction is desirable the texture and nature of the material can be modified over part or all of the sliding surface 60 where it comes in contact even lightly with surface 50. One such modification could be to utilize flocking at the interface of all or part of 50 and 60. This type of material and design will provide friction as a function of surface separation distance. Another surface modification, for providing braking or holding action is shown in FIG. 4.

Figure 2A:
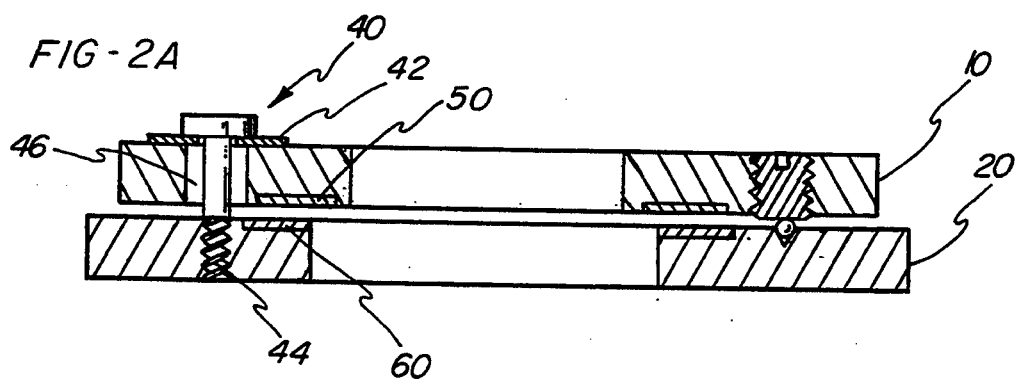
FIG. 2A is a cross section of a slider as a stage showing an open center.
Figure 2:
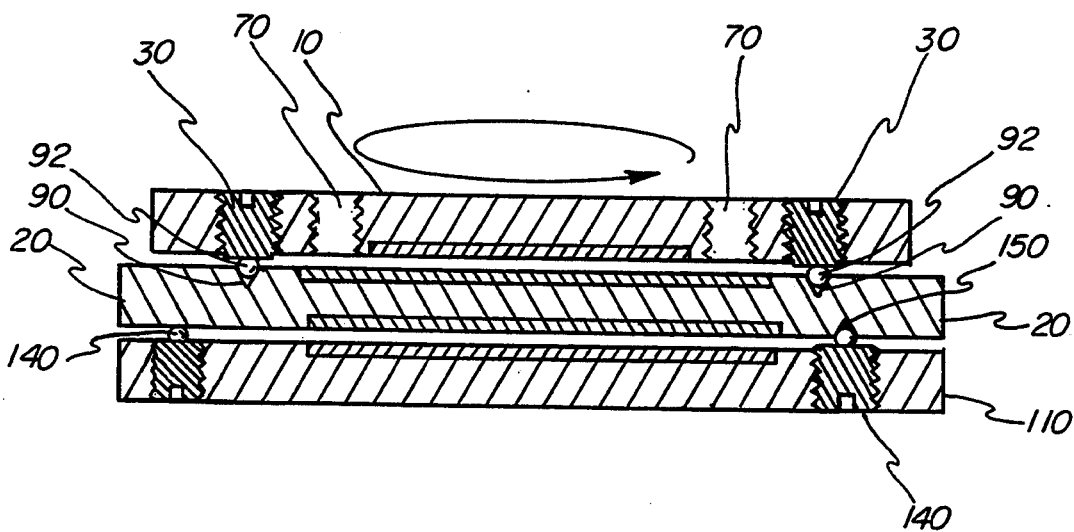
FIG. 2 is a cross section of two sliders showing two degrees of freedom.

Referring to FIG. 2 there is shown a practical application of the principles discussed in connection with FIG. 1. FIG. 2 is a cross section of an adjustable mount or positioner for optical tables and such. This adjustable mount or positioner provides two degrees of freedom of movement for an optical element or device mounted thereon the rotating part 10.

Part 10 FIG. 2 is magnetically held to part 20 where it is rotatable by means of adjustable bearings 30 in in circular groove 90 and part 20 is slidable in a groove 150 in part with a slight gap between 10 and 20. See FIG. 2A which is a cross section of 10 and 20 FIG. 2 taken diagonally across 10 and 20 at I—I.] 110 as in FIG. 1A. This provides two degrees of freedom.

FIG. 2A is a cross section of an open stage with a lock screw system (which also acts as a retainer) consisting of screw 40, washer 42 and threaded hole 44 in part 20 and open oversize hole 46 in part 10. These operate to hold parts 10 and 20 stationary when the proper position is achieved. In addition to utilizing muscular force for this positioning action there are available today electro-mechanical, pneumatic, hydraulic and magnostrictive mechanisms available as motivating devices.

Referring to FIG. 2B, part 110 is fastened to part 160 in a manner similar to the manner in which part 20 is fastened to part 60 by means of screws through part 160 into the edge of part 110. Part 160 rotates on part 170, like part 10 rotates on part 20 and part 60 rotates on part 70.

Part 170 slides horizontally across part 200 and part 200 slides orthogonally to part 170 across part 210, FIG. 2B. Part 210 can also move across a relatively large area such as an optical table. This gross movement can be in three degrees of freedom 1 rotational and 2 linear. The gross movement can be on bearings 218. The gross movement can also be a simple stepped movement in which the base plate 210 is moved to an approximate position and fastened to the optical table by means of screws through holes 216 into the standard holes on most optical tables.

The vertical part 110 of FIG. 2 is fastened to part 160 by screws 111. Part 160 rotates with respect to part 170. In this case it rotates on ball point set screw bearings 162 which screw though part 160 and ride in a circular V groove guide way 172 in the upper surface of part 170. Part 170 moves laterally on adjustable set screws bearings 174 in or on part 200. Two of these bearings ride in a V groove (the third on the surface) similar to but at a right angle to groove 240. Part 200 moves with respect to part 210 at right angles to the direction that part 170 moves with respect to part 200. This motion of part 200 is similar to the motion of 170 i.e. it moves on set screw bearings 212 and 214. Two of these bearings 212 ride in V groove 240 at right angles to the groove for bearings 174. The third adjustable bearing rides on the surface of part 210. Thus part 170 moves in a straight line in a direction across the drawing in contact with part 200. Part 200 in turn moves across part 210 in a perpendicular direction to the movement of 170 with respect to 200. The complete assembly with 6 degrees of freedom can be mounted on a standard optical table by means of mounting holes 216. Bearings 218 represent an alternate method of adjusting the gross position of the complete assembly on a ferromagnetic surface other than a conventional optical table.

In FIG. 2B the parts 160, 170, 200 and 210 are attracted to each other by magnetic forces. All or part of each element are alternately either permanent magnets or ferromagnetic material. In the case illustrated the parts 170 and 210 can be considered as magnets and the alternate parts 160 and 200 as ferromagnetic. These materials can be metallic, ceramic, molded plastic with suitable fillers or rubberized magnets. Inlays can also be used to provide the magnetic forces or bearing surfaces.

FIGS. 3 and 3A illustrate a computer mouse 100 rolling on a ferromagnetic surface 20. FIG. 3A is a cross section of the computer mouse showing a somewhat compressible ball 36 which rolls on surface or plate 20. The readout device for the position of the bail is indicated by box 37. Magnet 50 surrounding ball 36 is adjustable with respect to surface 20 by screws 62. The vertical position of the mouse with respect to the surface 20 is also adjustable by means of at least three adjustable bearings 63 positioned in member 10. Thus both the holding force of the magnet and the compressing force on the somewhat elastic ball are controllable. This results in a mouse which will hold its position on an inclined surface as well as a mouse with adjustable "feel."

Figure 4A:
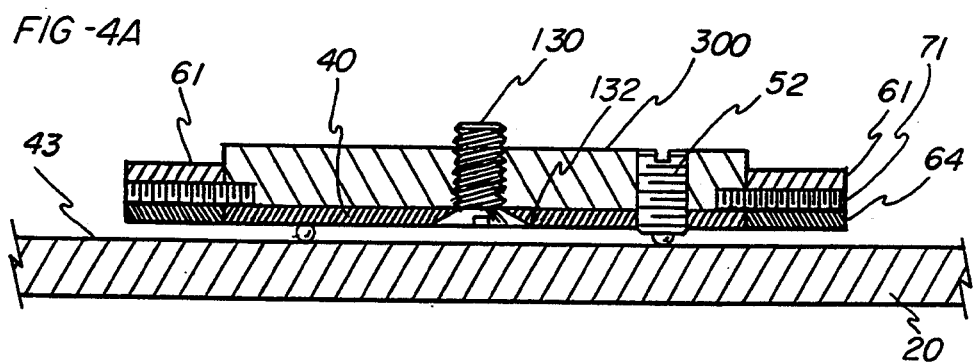
FIG. 4A is a cross section of FIG. 4 at 4A—4A.
Figure 4B:
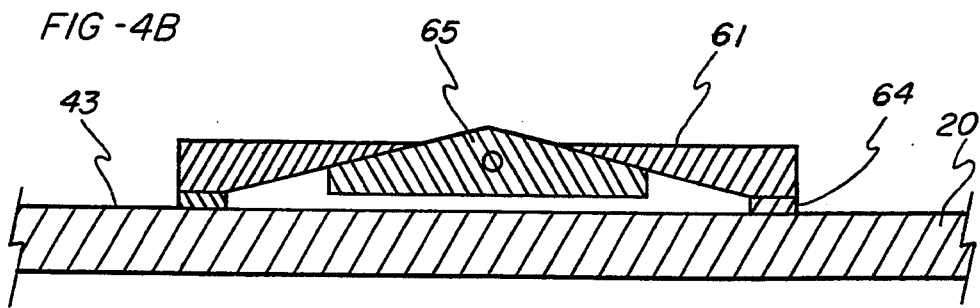
FIG. 4B is a cross section of FIG. 4 at 4B—4B.

FIGS. 4, 4A and 4B represent an adjustable positioning mount for cameras or other instruments. It has 3 degrees of freedom (one rational and two orthogonal). The motivating force for obtaining the desired position of this mount 300 (FIG. 4) with respect to base plate 20 is intended to be manual. If position control of a precision or accuracy not obtainable manually is desirable, this can be achieved by adding suitable actuators. In FIGS. 4 and 4A the mount or member 300 slides on the surface of base plate 20. The camera or instrument to be positioned is mounted on positioner 300 (FIGS. 4 and 4A) by means of threaded bolt 130 through hole 132. The under side of mount 300 is composed all or in part of a permanent magnet 40. This magnet is attracted to a ferromagnetic surface 43 on base plate 20 FIG. 4. At least 3 adjustable bearings 52 are mounted through positioner 300 FIG. 4 such that they can control the separation of magnet 40 and ferromagnetic surface 43 and thus the attractive force between them.

Fastened to mount 300 FIGS. 4 and 4A as an integral part thereof are one or more magnetic position-locks 61. These position-locks consist of means for holding a permanent magnet 64 out of contact with ferromagnetic surface 43 until needed for locking and then releasing this magnet to be lowered to the attracting ferromagnetic surface and thus holding mount 300 stationary with respect to plate 20.

FIG. 4B is a cross section of FIG. 4 and further illustrates a possible locking action. In the center of locking device 61, FIGS. 4 and 4B, which is attached to positioner 10 are permanent magnets 64 which slide on wedges 65. These magnets when pressed together against a spring are lifted away from base 20 and when the pressure is removed the magnets are lowered against ferromagnetic surface of base 20 and held in place by the magnetic force. These devices 61 are held in position against the slider 10 by the screws 71. Two of these locking devices may be used together at each end of the slider mount 300 or only one may be required.

In FIGS. 4, 4A and 4B the surface of magnets 40 and 62 where they come in contact with ferromagnetic surface 43 and or the ferromagnetic surface itself can consist of a soft or texturized material such that the friction and sticking between surfaces of magnets 40 and 62 and surface 43 will be increased and thus provide a better holding force when the surfaces are not horizontal.

A simple permanent magnet or block fastened to part 20 FIGS. 4, 4A and 4B on which is mounted accurate motivating means such as a micrometer screw or electromechanical actuator acting against a free moving 3 degrees of freedom slider can be used to add fine motion control to the course manual action.

Figure 5:
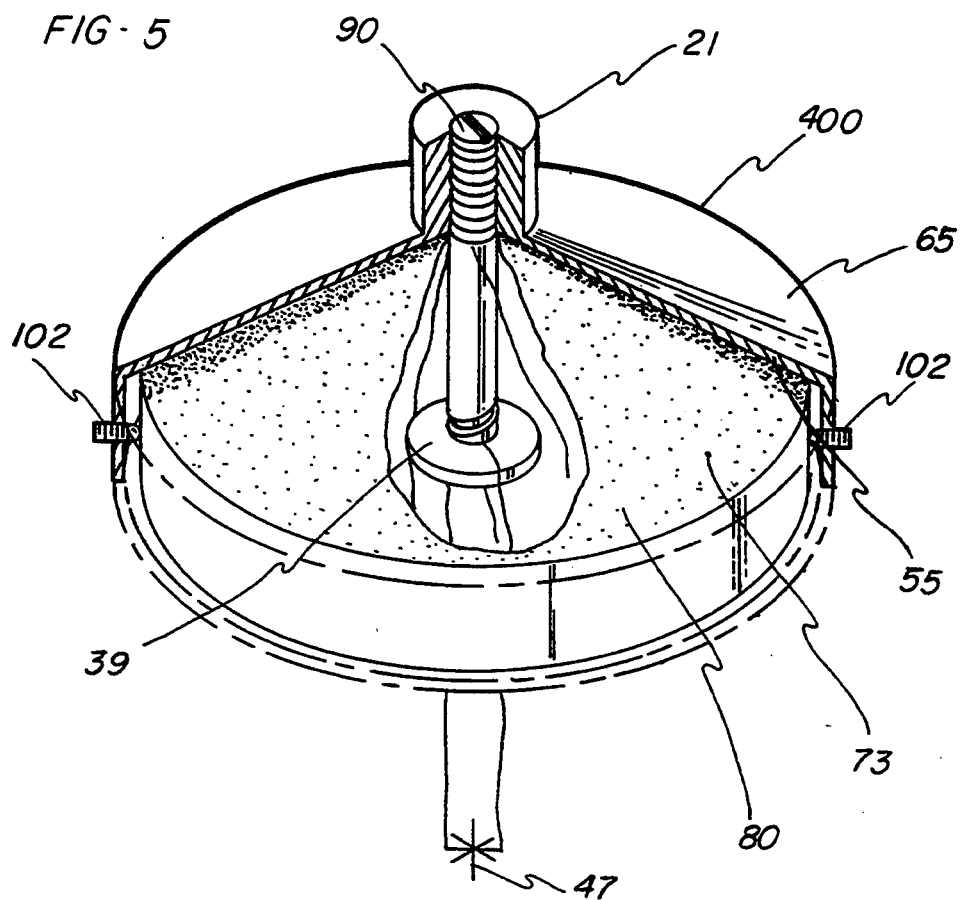
FIG. 5 illustrates how the principles of this invention apply to a rotating adjustment device in which the position of the control knob is indicated by "feel.

Referring now to FIG. 5, there is illustrated a cut away perspective drawing of a rotational device 400 with a "variable feel" which provides feedback to the operator of the device and thus implies the position of rotation of the device. The rotating shaft of this device controls an electric or mechanical system or subsystem. The condition or state of this subsystem is related to the position of the shaft. Thus the "feel" of the rotational device is "feedback" on the state of the subsystem. For example if knob 21, FIG. 5, controls a servo-mechanism, potentiometer or rheostat 39 internal to the device and related to say the position of a rudder 47 then the "feel" of the control transmits to the operator the position of the rudder 47. While this position can be made apparent visually related to 21 there are times when this is not convenient. ontrolling, in design and manufacturing, the area of magnet 55, FIG. 5, on the underside of rotating part or member 65 and or controlling, in design and manufacturing, the area of the ferromagnetic surface 73 in the surface 80 plate, the force required to rotate knob 21 will vary depending on how milch magnetic surface is in the vicinity of how much ferromagnetic surface. Thus the "feel" of the rotational moment will depend upon the position of part 65 with respect to surface 73. This position is directly related to the position of controller 39 which can be a potentiometer, rheostat, inductance, capacitance, valve mechanical transducer, etc. The position of the controller 39 is directly related to the end output such as the position of rudder 47.

In FIG. 5 I have chosen to represent member surface 65 and plate 80 as cones, they could just as well be flat, spherical, 3 degree curves of rotation or cylindrical etc. The operation would be very similar.

FIG. 5 also demonstrates how one adjusting bearing screw 90 can be used to adjust the distance between parts 65 and 80 by raising or lowering part 65. FIG. 5 also demonstrates how bearings 102, required for maintaining stability and position need not always be on or in a plane parallel to the plane of motion.

Figure 6:
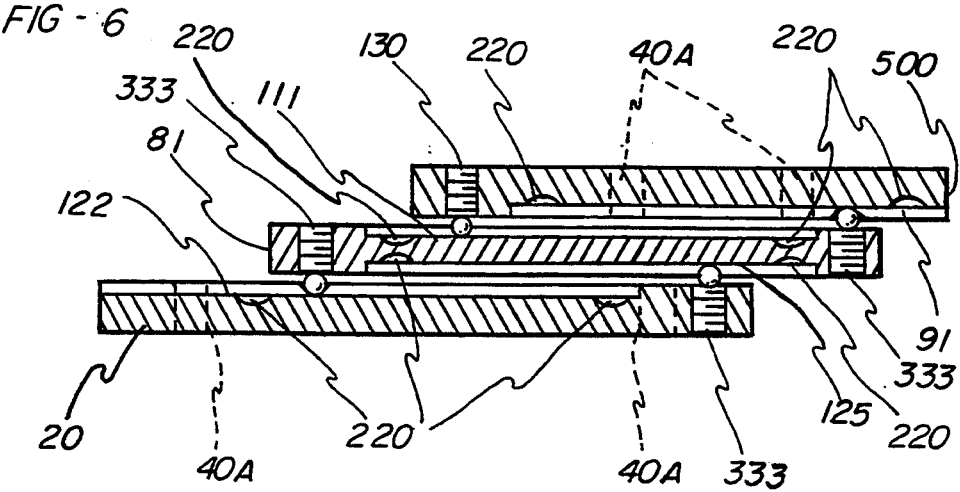
FIG. 6 illustrates a drawer slider incorporating the principles of this invention including ball detents for stopping action, variable area magnets or ferromagnetic material for varying the magnetic force to adjust the balance.

My magnetic slider described in this invention can also be used to provide a smooth acting drawer slide with or without magnetic stops or locking. FIG. 6 illustrates one form of this application which can be attached to the bottom or sides of a drawer. Similar adjustable magnetic sliding arrangements can also be incorporated into a conventional drawer slide and the action can also be accomplished with only two sliding pieces as previously discussed.

In FIG. 6 the top piece 500 can be fastened to the drawer while the bottom piece 20 is attached to the cabinet or box in which the drawer slides. This slider is mounted such that the plane of the sliding motion is parallel to the motion of the drawer. This can be done by using mounting holes 40a for attachment to the drawer bottom with similarly located holes on the bottom or side piece of the cabinet.

In FIG. 6 the central piece 81 is all or in part a permanent magnet attracted to pieces 500 and 20 which are all or part ferromagnetic material. The four guide ways or grooves; 91 in top piece 500, 111 on top side of center piece 81, 121 on bottom of center piece 81 and 122 on the top of bottom piece 20, guide the drawer movement in a straight line by means of the 4 adjustable identical bearings 333 in FIG. 6. No limit is placed on the number of bearings used. If more than one slider per drawer of the type described above is used, however, either on the bottom or sides only one slider is required to have the guide ways or grooves. The bearings in the other sliders rest on a surface such that side ways movement is not restricted and thus normal tolerances of construction will not restrict the motion.

A simpler two piece arrangement is feasible for some applications and this can best be illustrated and described by considering that the central slide is fastened to one of the other slides and that the adjustable bearings extend through both pieces.

The force of the magnetic attraction between the sliding pieces just described can be made to vary as a function of the position of the drawer. Thus when the drawer is opened and extended a greater force will hold it up to prevent tipping. Detents such as 220 the grooves (FIG. 6) can also be used to bring the surfaces closer together when the drawer is closed and thus increase the magnetic attraction to produce a temporary stop.

One way to accomplish this is to provide a greater area of attraction when the drawer is extended by having more ferromagnetic material at an end of piece 500 at 170 and more magnetic material at an end of piece 81 and likewise at the ends of piece 81 and 20 where they overlap when the drawer is extended.

Instead of more or less magnetic and ferromagnetic material as a function of position along the sliding pieces the separation distance can be varied, and thus the force, by varying the depths of the guideway grooves.

Figure 7:
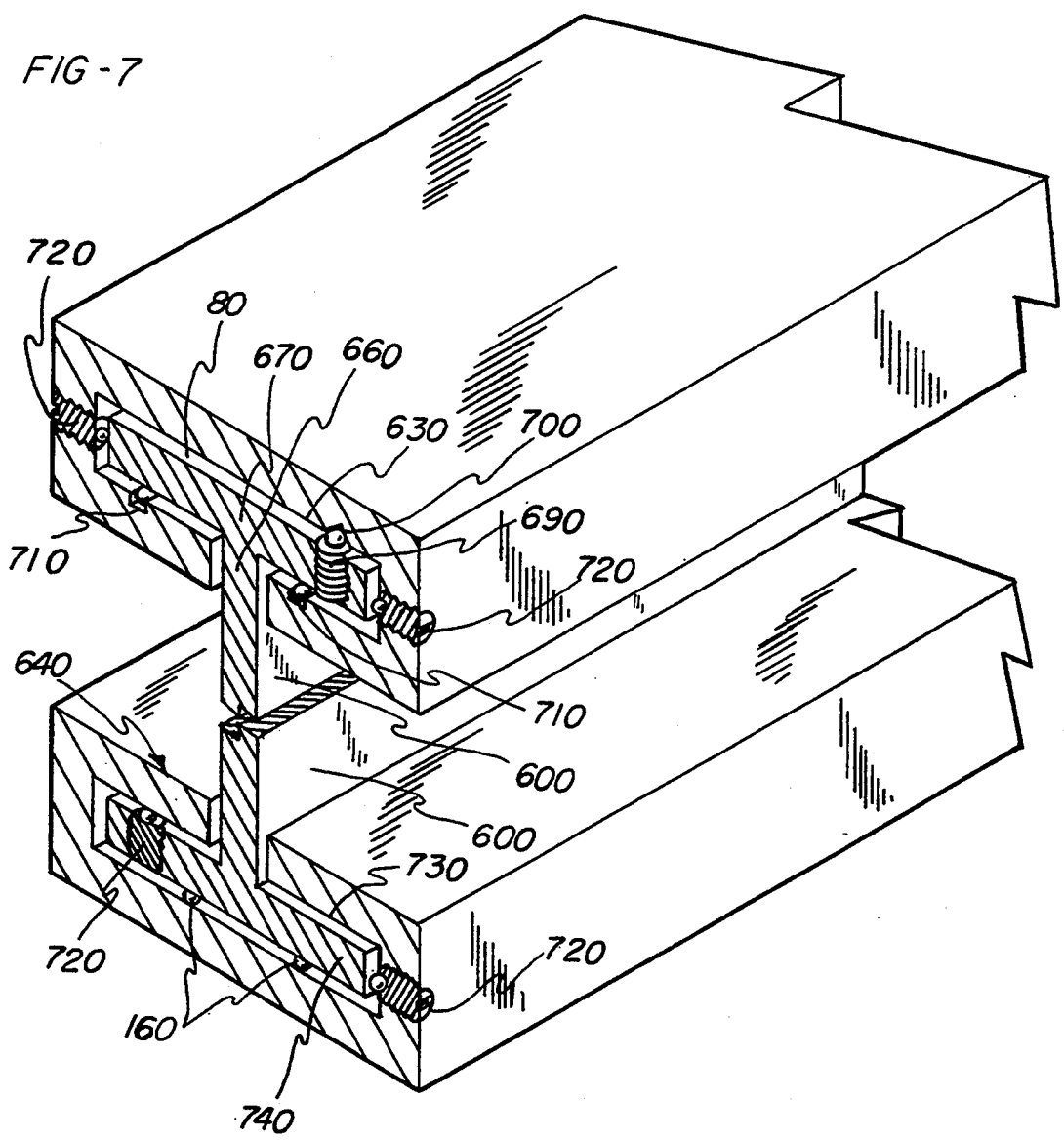
FIG. 7 illustrates a sliding door incorporating the principles of this invention with magnetic sliding areas at either or both the top and bottom of the door.
Figure 7A:
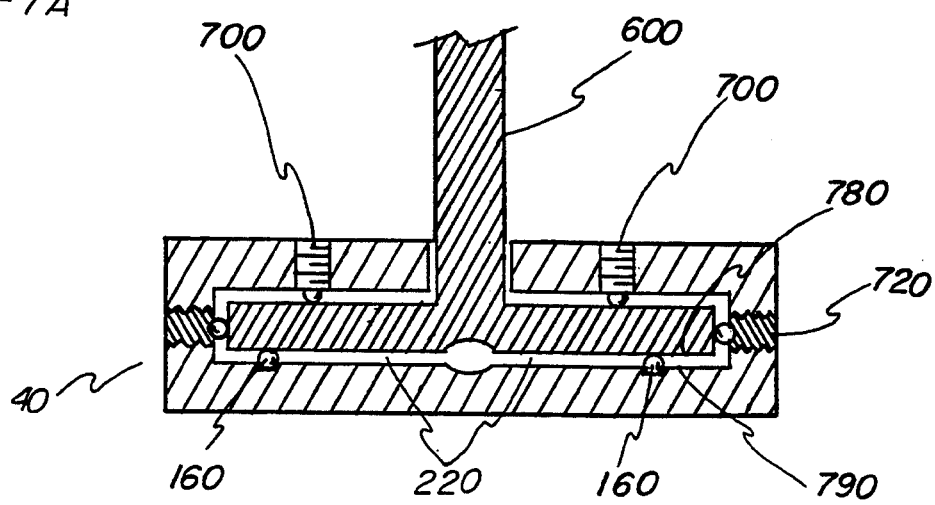
FIG. 7A is a cross section of another embodiment of of the lower support portion of the apparatus shown in FIG. 7.

Referring now to FIGS. 7 and 7A we see illustrated the essentials of my invention as they apply to a sliding door 600 hung in a vertical position. Door 600 slides in or along upper track 630 and lower track 640 on bearings as shown in FIG. 7. Upper track 630 and lower track 640 are constructed parallel to each other or adjusted by means of an adjusting device such that they are parallel.

FIG. 7 is a perspective of the upper and lower tracks 630 and 640 and shows a portion of the sliding door 600 which slides therein and illustrates an arrangement of the magnets, bearings and ferromagnetic surfaces that could be utilized in either the top or bottom slides or both.

In FIG. 7 an internal sliding component 660 with door 600 attached slides in upper track 630. The upper side of slide 660 is composed all or in part of a magnet 670. The surface or material of track 630 directly above slide 660 is ferromagnetic, at least in part, and thus there is a magnetic attractive force acting between 630 and 670 tending to lift door 600 from lower track 640. This force is constrained from bringing 670 and 680 into contact by means of at least 3 adjustable bearings such as 690 and discussed elsewhere in this specification. Two of these adjustable bearings 690 can ride in guide slot 700 located in the upper track 630. In case the weight of the door 600 becomes so great as to cease to be attracted to the upper track surface 680 it can fall against bearings 710 located either on the under side of upper track 630 or in the lower track 640. These bearings will usually not be in contact with a moving surface but if they are they will produce a minimal frictional resistance to the movement of the door. Side restraint bearings 720 may be required in some cases.

Another possibility for designing a sliding door with adjustable magnetic assistance is to provide such magnetic action in the lower track in addition to or in place of the magnetic action in the upper track.

At the bottom track 640 the magnetically active surfaces are indicated at 730 and 740 respectively and held apart by 3 or more adjustable bearings 720. Fail safe bearings 760 and side constraint bearings may also be required as shown in FIG. 7.

FIG. 7A demonstrates how controlled magnetic suspension or elevation could be used either alone or in combination with controlled magnetic attraction on other surfaces. FIG. 7A shows the lower track 640 and door 600 in FIG. 7 in cross section. Attached to door 600 is magnet 780 oriented such that the north pole is opposed to the north pole of magnet 790 in the base of track 740. Likewise the south pole of this magnet will be opposed by the magnet 790 in the base and a repulsive force will be exerted between them. Adjustable bearings such as 700 control the separation of these magnets (along with the weight of the door and the strength of the magnets), and thus the repulsive force is controlled. Side restraint bearings 720 may also be required. Also fail safe bearings 160 may be required. The weight of the door and the repulsive forces of the magnets will tend to balance out and act in such a way as to produce very little friction and wear on the bearings. The manual or mechanical force required to move the door will depend almost entirely on its mass. A very small force (at low acceleration) could move the door, although slowly at the start.

FIG. 8 represents in cross section another type of slider for holding instruments or other devices or tools to a bar or pipe. Part 800, FIGS. 8 and 8A, illustrates a structure which slides along pipe or bar 20a. This bar or pipe can have any cross sectional shape. A circular shape is shown in FIGS. 8 and 8A. Interior to sliding member 800 are a set of magnets 830 (see FIG. 8) so placed around 20a as to provide a good lateral relationship. Magnets 830 are connected to slides 800 as indicated by adjustable screws 840 or by spring or elastic compressible material 850 holds magnet 830 in the vicinity of the ferromagnetic surface 860 of bar or pipe 20a where it is attracted to this surface. Magnets 830 are prevented from forming a dragging contact on surface 860 by adjustable bearings 870. These adjustable bearings 870 are adjusted through holes in slider 800. Threaded mounting holes 890 are indicated as one means of attaching useful devices to slider 800. A V slot 802 (FIG. 8) cut into and along the bar or pipe to prevent rotation of the slider may be required.

In FIG. 8 there is also illustrated a magnetic locking device 894 incorporated into one of the sliding magnets 830 or completely replacing one of the sliding magnets. This locking magnet can be raised or lowered against ferromagnetic surface 866 by means such as sliding wedge 895 acting on magnet 896 to force it against surface 860.

Locking magnet 894 FIG. 8 could also be a spring loaded electromagnet which when activated moves toward and against 20a to provide holding action.

While FIGS. 8 and 8A describe a sliding device sliding along a bar or tube of circular cross section, the same general approach can be used in constructing sliders that slide on other structures having cross sections such as I beams, L beams, T bars rectangular, etc.

The surface on which the magnetic sliders discussed in this invention slide need not be a simple geometric form either planar or a surface of revolution. Magnetic sliders of the type discussed here can be made to slide along extended surfaces of complex shapes such as window frames, door frames and picture frames. The material of which such items are constructed need not be ferromagnetic or magnetic. They can be totally or partially covered with a paint or coating containing ferromagnetic material.

FIGS. 9 illustrates a device operating on such a surface. The sliding part 900 in the device illustrated in FIG. 9 represents a holder fox, a traverse type curtain that requires no conventional "traverse rod," but rather slides across the complex shape 200 of the window frame itself. The inside surface of 900 FIG. 9 is all or part composed of a magnet 930. Adjustable bearings 940 rest on magnetic surface 950. This surface 950 on frame 208 is composed either all or in part of ferromagnetic material or frame 208 is coated with a ferromagnetic material such as ferromagnetic paint.

Cords 970 fastened as shown in FIG. 9 operate through holes 980 to complete the usual traverse movement. The curtain is fastened to part 900 as it moves along 208.

This invention is applicable to any guided body movable in a plane or along a curved path defined by a guiding track or structure wherein the motion is controlled or restrained to produce a smooth even action.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A slide mechanism comprising;
    a first slide defining a first surface having at least a portion thereof made of a magnetic material;
    a second slide defining a second surface adjacent to the first surface of the first slide, the second surface having at least a portion thereof comprising a magnetic material, the magnetic material of the second surface and the magnetic material of the first surface attracting each other; and
    at least two means for adjusting a distance between the first and second surfaces, each means for adjusting having a set screw and at least one bearing on said set screw, each means for adjusting disposed in one of the first and second slides, the bearing of the means for adjusting resting against one of the first and second surfaces of the first and second slides in which the means for adjusting is not disposed.

2. The slide mechanism according to claim 1 wherein the bearing of each means for adjusting is a ball bearing.

3. The slide mechanism according to claim 1 wherein one of the first and second surfaces magnetic portions comprises permanent magnetic material and the other of the second and first surfaces magnetic portions comprises ferromagnetic material.

4. A slide mechanism comprising;
    a first slide defining a first surface having at least a portion thereof made of a magnetic material, the first slide defining at least one channel;
    a second slide defining a second surface adjacent to the first surface of the first slide, the second surface having at least a portion thereof comprising a magnetic material, the magnetic material of the second surface and the magnetic material of the first surface attracting each other; and
    at least two bearing set screws for adjusting a distance between the first and second surfaces, each bearing set screw having two ends with a bearing disposed in one end of the set screw and a head disposed on the second end of the set screw for turning the set screw, each bearing set screw disposed in the second slide, each bearing of said bearing set screw disposed in the channel defined by the first slide.

5. The slide mechanism according to claim 4 wherein the bearing of each bearing set screw is a ball bearing.

6. The slide mechanism according to claim 5 wherein the channel defined by the first slide is a V channel.

7. The slide mechanism according to claim 4 wherein the bearing of each bearing set screw is a roll bearing.

8. The slide mechanism according to claim 4 wherein one of the first and second surfaces magnetic portions comprises permanent magnetic material and the other of the second and first surfaces magnetic portions comprises ferromagnetic material.

9. The slide mechanism according to claim 6 wherein the first slide is a base plate and the second slide is a slide plate.

10. A slide mechanism for, comprising;
    a member having at least a portion thereof comprising a magnetic material;
    a plate having a first surface with at least a portion of the first surface thereof comprising a magnetic material, the magnetic material of the plate and the magnetic material of the member adjacent each other and attracting each other; and
    at least one bearing set screws for adjusting a distance between the member and the first surface of the plate, each of the set screws having two ends, with a bearing disposed in one end of the set screw and a head disposed on the opposite end of the set screw for turning the set screw, the bearing set screw being disposed in the member, the bearing of the bearing set screw resting against the first surface of the plate.

11. The slide mechanism according to claim 10 wherein the member is conical and the plate is conical.

12. The slide mechanism according to claim 10 wherein the member is planar and the plate is planar.

13. The slide mechanism according to claim 10 wherein the member is cylindrical and the plate is cylindrical.

14. The slide mechanism according to claim 10 wherein the member is spherical and the spherical is cylindrical.

15. The slide mechanism according to claim 10 wherein one of the member's and plate's magnetic portion comprises permanent magnetic material and the other of the plate's and member's magnetic portion comprises ferromagnetic material.

16. A slide mechanism comprises a plurality of slides, each of said slides having:
    (a) a first slide member defining a first surface having at least a portion thereof made of a magnetic material, the first slide member defining at least one channel;
    (b) a second slide member defining a second surface adjacent to the first surface of the first slide mechanism, the second surface having at least a portion thereof comprising a magnetic material, the magnetic material of the second surface and the magnetic material of the first surface attracting each other; and
    (c) at least two bearing set screws for adjusting a distance between the first and second surfaces, each bearing set screw having two ends with a bearing disposed in one end of the set screw and a head disposed on the second end of the set screw for turning the set screw, each bearing set screw disposed in the second slide member, each bearing of said bearing set screw disposed in the channel defined by the first slide member.

17. The slide mechanism according to claim 16 wherein each slide defines a channel for disposing each bearing of said bearing set screw of the adjacent slide in the channel.

18. The slide mechanism according to claim 17 wherein at least two of the slides have slide member which are disposed perpendicular each other for providing movement in a plurality of planes.

19. The slide mechanism according to claim 18 further comprising a base member lying along one of the plurality of planes parallel to one of the plurality of slide mechanisms and attached to one of the slide members of the slide mechanism, the base member having a means for adjusting the slide mechanism at various positions along the plane.

20. The slide mechanism according to claim 18 further comprising a plurality of said base members each lying along a plane parallel to and attached to one of the plurality of slides, each-base member having a means for adjusting its respective slide at various positions along its plane.

* * * * *